United States Patent [19]
Hosoya

[11] Patent Number: 5,984,263
[45] Date of Patent: Nov. 16, 1999

[54] SOLENOID VALVE DEVICE

[75] Inventor: Yukio Hosoya, Hamakita, Japan

[73] Assignee: Nisshinbo Industries Inc., Tokyo, Japan

[21] Appl. No.: 08/779,076

[22] Filed: Jan. 8, 1997

[30] Foreign Application Priority Data

Jan. 12, 1996 [JP] Japan .................................. 8-021962

[51] Int. Cl.$^6$ ................................................. F16K 31/06
[52] U.S. Cl. .................................. 251/129.15; 29/890.13
[58] Field of Search ............................... 251/129.15, 359; 137/454.2, 454.5, 454.6; 29/890.13, 890.124, 890.132

[56] References Cited

U.S. PATENT DOCUMENTS

| | | | |
|---|---|---|---|
| 5,184,804 | 2/1993 | Shea | 251/359 X |
| 5,333,836 | 8/1994 | Fukuyo et al. | 251/129.15 |
| 5,460,350 | 10/1995 | Nagashima et al. | 251/129.15 |
| 5,653,249 | 8/1997 | Reinartz et al. | 251/129.15 X |
| 5,853,017 | 12/1998 | Volz et al. | 251/129.15 X |

*Primary Examiner*—Kevin Lee
*Attorney, Agent, or Firm*—Nikaido, Marmelstein, Murray & Oram LLP

[57] ABSTRACT

A solenoid valve device which is easy to assemble and is sealed tightly to prevent leakage of the pressure medium. An armature assembly (30) is inserted into the housing cavity (21) of the housing (20), then affixed by a primary caulked portion (A) which has plasticly deformed a portion of the housing (20). The primary caulked portion (A) is then reinforced with a secondary caulked portion (B) which has plasticly deformed another portion of the housing (20) onto a collar (50). At the same time, the bottom face of the valve plate (31) is forced against the bottom of the housing cavity (21), wherein the housing cavity between the atmosphere end and the pressure medium end, and between the pressure medium ducts on either side of the valve mechanism is sealed fluid-tight.

6 Claims, 6 Drawing Sheets

SOLENOID VALVE DEVICE

BACKGROUND OF THE INVENTION

This invention relates to a solenoid valve device which opens or closes various pressure medium ducts in solenoid valves used in vehicles and for other purposes.

There is known a method of securing solenoid valves in a housing. As shown in FIG. 7, in this type of solenoid valve device, several solenoid valves c are incorporated in a housing cavity b formed inside a housing a. In order to prevent its expulsion from the housing cavity b by the pressure of the pressure medium, that side of the solenoid valve c on the open end of the housing (hereinafter atmosphere end h) is covered with a very rigid plate d which is affixed to the housing with bolts e. However, the securing of the solenoid valves c in this manner requires much time and effort. Further, the attachment of the plate d increases the outer dimensions and weight of the device. Another publicly-disclosed method of securing the solenoid valves c is to mount all of the valves inside the housing cavity, then a covering is screwed over the mouth of the housing cavity. Again this method requires time and effort in fabricating the screws for the housing cavity and in setting the cover.

Also, the solenoid valves c must be tightly sealed to prevent leakage of the pressure medium. Conventionally, a rubber O-ring g is mounted externally on the port f formed on one or both sides of the solenoid valve c in order to secure a seal with the housing cavity. However, since the plate d will not bend under the pressure of the pressure medium, in cases where the pressure changes repeatedly, the rubber O-ring g mounted on the solenoid valve c will easily erode as it slides back and forth repeatedly within the housing cavity b while bearing the pressure. Such wear and tear decreases the reliability of the seal. Another indicated problem is that in cases where the solenoid valve c does shift toward the mouth of the housing cavity, consumption of the pressure medium will increase in an amount corresponding to the shift.

OBJECT AND SUMMARY OF THE INVENTION

This invention was devised to resolve the aforementioned problems, and to that end, provides a solenoid valve device in which the affixing of the solenoid valve to the housing and its sealing therein to prevent the leakage of the pressure medium is performed simultaneously, thus facilitating the overall assembly as compared to that required for conventional devices.

The invention also provides a solenoid valve device in which the pressure medium is tightly sealed to prevent any leakage.

This invention is a solenoid valve device comprising a housing containing at least one housing cavity, an armature with a valve plug which is housed to slide within a sleeve, a valve which contains a valve seat and together with the valve plug forms a valve mechanism, and a coil assembly which operates the armature with an electromagnetic force; wherein an armature assembly formed from the valve, armature, and sleeve is inserted into the housing cavity that has a variable, stepped diameter. The armature assembly is affixed around its perimeter by caulking by causing a portion of the housing to plasticly deform towards the bottom of the housing cavity. Meanwhile, the bottom face of the valve seat forming the armature assembly is forced against the bottom side of the housing cavity. The armature assembly is thus affixed to the housing by means of the caulking. In this manner, the housing cavity between the atmosphere end and the pressure medium end, and between the pressure medium ducts on either side of the valve mechanism is sealed fluid-tight.

In addition, this invention includes a solenoid valve device comprising a housing containing at least one housing cavity, an armature with a valve plug which is housed to slide within a sleeve, a valve which contains a valve seat and together with the valve plug forms a valve mechanism, and a coil assembly which operates the armature with an electromagnetic force; wherein an armature assembly formed from the valve, armature, and sleeve is inserted into the housing cavity that has a variable, stepped diameter. The armature assembly is affixed around its perimeter by caulking by causing a portion of the housing to plasticly deform towards the bottom of the housing cavity. Meanwhile, the bottom face of the valve plate forming the armature assembly is forced against the bottom side of the housing cavity. A collar on which a shoulder is formed around its periphery is arranged between the housing cavity and the sleeve. The collar is contracted around its perimeter by primary caulking and by secondary caulking by causing another portion of the housing to plasticly deform towards the bottom of the housing cavity. The armature assembly is thus affixed to the housing by the collar. The housing cavity between the atmosphere end and the pressure medium end, and between the pressure medium ducts on either side of the valve mechanism is sealed fluid-tight.

Further, one end of the valve seat on the atmosphere end is formed in small-diameter. The sleeve fits concentrically over the small-diameter portion to form the armature assembly.

Moreover, this invention includes a solenoid valve device in which a circular protuberance is formed on the bottom face of the valve block. The circular protuberance penetrates into the bottom of the housing cavity to form a fluid-tight seal between the pressure medium ducts on either side of the valve mechanism.

Finally, this invention includes a solenoid valve device in which the collar is made of a magnetic material.

BRIEF EXPLANATION OF DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENTS

EXAMPLE 1

A first example of this invention is explained below with reference to the diagrams.

Figure 1:
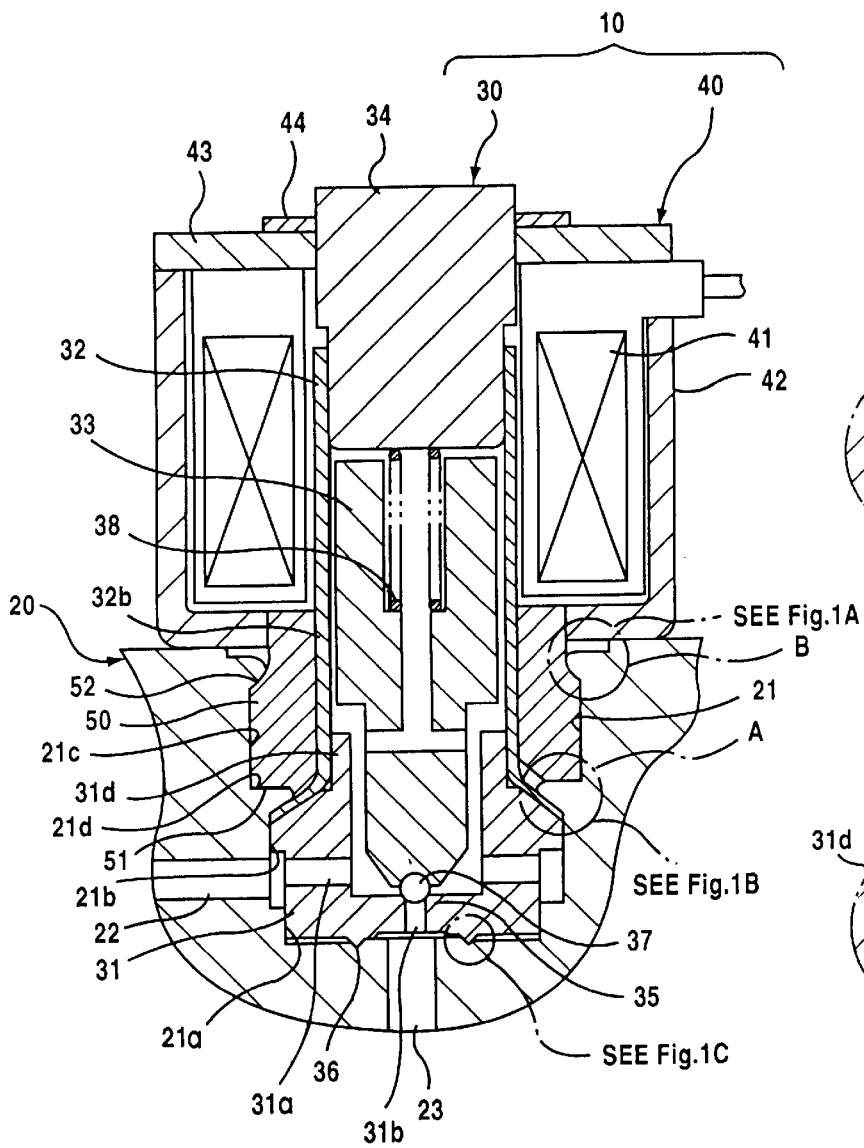
FIG. 1 is a cross section diagram of a first embodiment of the solenoid valve device of this invention.
Figure 1A:
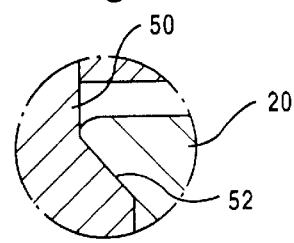
Figure 1B:
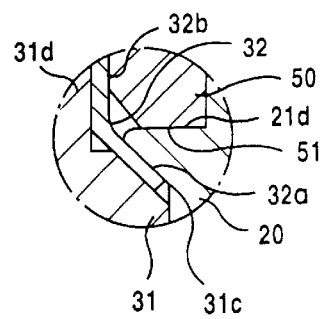
Figure 1C:
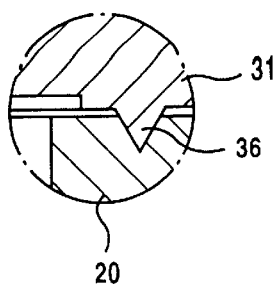

FIG. 1 illustrates the overall configuration of one example of the solenoid valve device. The solenoid valve device is configured from a normally-open or a normally-closed solenoid valve 10 and the housing 20 in which the solenoid valve 10 is assembled. This example explains the invention for a normally closed solenoid valve.

The solenoid valve 10 is configured from an armature assembly 30 which is mounted in the housing 20, and a coil assembly 40 mounted externally around the armature assembly. The solenoid valve has been subassembled for direct mounting in the housing 20.

A double sealing method using a primary caulked portion A and a secondary caulked portion B to the housing 20 by the collar 50, to be described later, is employed to affix and seal the armature assembly 30 to the housing 20.

The housing 20 is made from aluminum or an aluminum alloy.

Housing cavities 21 are bored in the housing 20 in an amount equal to the number of solenoid valves to be mounted. Each housing cavity 21 is of variable diameter over its length, and starting from the closed end or bottom of the cavity, has a small-diameter segment 21a, a medium-diameter segment 21b, and a large-diameter segment 21c. The segments 21a, 21b and 21c are formed contiguously. A stepped face 21d is formed at the boundary between the large-diameter segment 21c and the medium-diameter segment 21b.

An exit port 22 and inlet port 23 (or exit port 23 and inlet port 22) are formed in the side face of the medium-diameter segment 21 b and the bottom face of the small-diameter segment 21a respectively.

The armature assembly 30 is configured from a valve plate 31 which is mounted inside the housing cavity 21, a sleeve 32 mounted on the valve plate 31, an armature 33 housed inside the sleeve 32, and a magnet core 34, made of a magnetic material and affixed at the open end of the sleeve 32.

Fluid ducts 31a, 31b are bored in the side and the bottom respectively of the valve seat 31 to connect to the exit port 22 and inlet port 23. A valve seat 35 is formed on the end of one fluid duct 31b. A circular, notched protuberance 36 is provided on the bottom face of the valve plate 31 and seals the perimeter of the port 23 when the valve plate is mounted in the housing.

The upper end of the valve plate 31 on the side of the valve plate away from the valve seat and atmosphere side of the housing cavity is shaped having a supporting face 31c and a small diameter component 31d at the tip. A tapered cuff 32a is formed on the end of the sleeve 32 opposite the open end. The dimensions of the small-diameter component 31d of the valve plate 31 and the dimensions of the tubular segment 32b of the sleeve 32 are set so that the tubular segment of the sleeve can fit snugly around the small diameter component. As well, the supporting face 31c of the valve plate 31 and the cuff 32a of the sleeve 32 are each shaped so that the two faces can be in contact. The shape of the contact plane can be stepped, and is not restricted to that shown in FIGS. 1 and 2.

A valve plug 37 is provided on the lower end of the armature 33, and together with the valve seat 35 forms a valve mechanism to open and close both fluid ducts 31a, 31b (and the exit and inlet ports 22, 23). The armature 33 is energized by the spring force of springs 38 compressed between the armature and the magnet core 34 to close the valve mechanism.

The valve plate 31, sleeve 32, and armature 33 are pre-assembled into an integrated unit such that the central axes of each component are concentric.

The sleeve 32 can be affixed to the valve plate 31 and to the magnet core 34 by caulking, laser welding, or any other suitable bonding method.

The coil assembly 40 is configured from a cylindrical coil 41 which is formed by winding conductor wires into a coil to enclose the sleeve 32 and which is covered with a resin, a yoke ring 42 mounted externally around the coil 41, and a circular yoke 43 sealing the opening of the yoke ring 42.

When the coil 41 is de-energized, the armature 33 is de-magnetized, and receiving the spring force of the springs 38, the valve plug 37 is seated in the valve seat 35 to block the fluid ducts. Conversely, if the coil 41 is energized, the magnetized armature 33 is pulled towards the magnet core 34 while compressing the springs 38, causing the valve plug 37 to be separated from the valve seat 35, thereby allowing passage through the fluid ducts.

The tubular collar 50 is made of a magnetic material, with an inner diameter equal to the outer diameter of the sleeve 32. A shoulder 52 is formed around its circumference, and its bottom face forms a pressure face 51.

Figure 2:
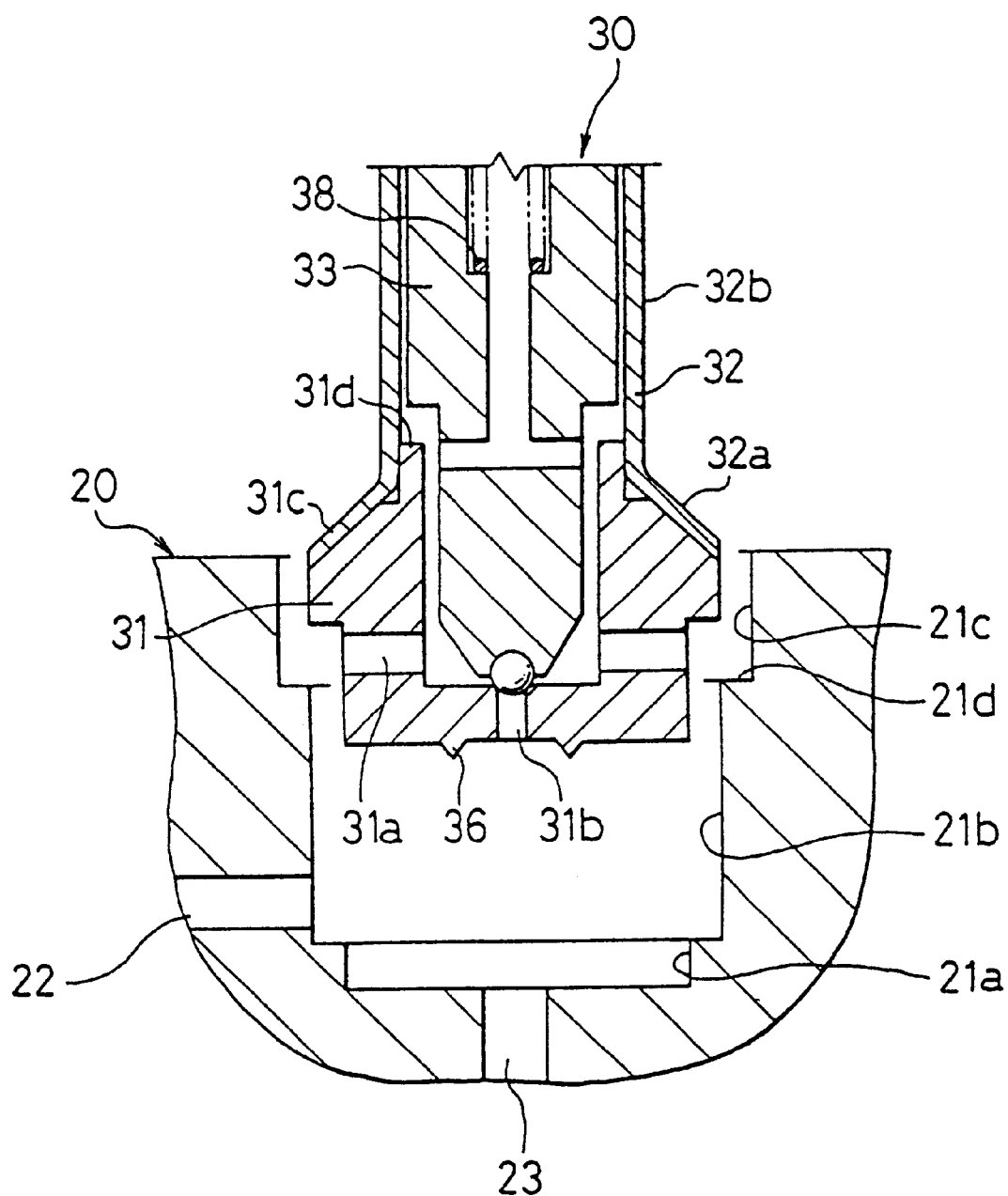
FIG. 2 is a partial cross section diagram of the solenoid valve device of FIG. 1 illustrating the mounting of the armature assembly inside the housing.

The assembly of the solenoid valve device is explained in the following:

1. Fabrication of Armature Assembly (FIG. 1, FIG. 2)

Generally, the performance and stability of a solenoid valve is greatly affected by the precision with which the valve plug and valve seat forming the valve mechanism is assembled. In this invention, the sleeve 32 fits concentrically over the small-diameter component 31d of the valve plate 31 to prevent the central axes of the valve plug 37 and the valve seat 35 from being off-center and ensure accurate assembly.

In addition, the integration of the valve plate 31 with the sleeve 32 enables the armature assembly to be sub-assembled.

2. Installation of Armature Assembly

The armature assembly 30 is inspected, then inserted into the housing cavity 21 of the housing 20. It is affixed and sealed to the housing 20 by the primary caulking and secondary caulking processes described below.

Figure 3:
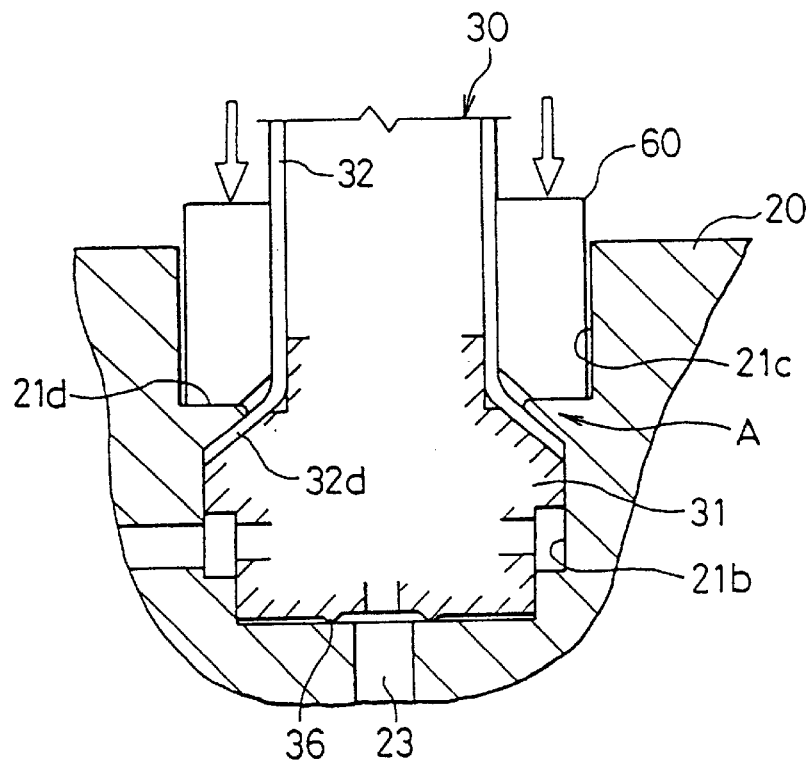
FIG. 3 is a partial cross section diagram of the solenoid valve device of FIG. 1 illustrating the affixing of the armature assembly with a primary caulking.

(a) Primary Caulking (FIG. 2 and FIG. 3)

The valve plate 31 side of the armature assembly 30 is inserted into the housing cavity 21. At this stage, the armature assembly 30 is not affixed to the housing 20; rather the bottom face of the valve plate 31 is simply in contact with the closed end of the housing cavity 21, and the side face of the valve plate 31 abuts against the medium-diameter segment 21b of the housing cavity.

Then, as shown in FIG. 3, an annular first caulking tool 60 is inserted into the large-diameter segment 21c of the housing cavity 21 and pressed down on the stepped face 21d. The pressure of the caulking tool 60 will cause a portion of the housing 20 material to plasticly deform towards the closed end of the housing cavity 21, and caulk to the cuff 32a of the sleeve 32 to Form the primary caulked portion A. The primary caulked portion A presses the sleeve 32 and the valve plate 31 towards the closed end of the housing cavity 21 and functions as an immobilizing component to affix the armature assembly 30 to the housing 20. It also functions as a sealing material to form a fluid-tight seal between the medium-diameter segment 21b and the large diameter segment 21c of the housing cavity 21. Moreover, since the pressure of the primary caulked portion A acts uniformly on the cuff 32a of the sleeve 32, the armature assembly 30 can be mounted precisely to hang plumb inside the housing cavity 21.

In addition, the pressure of the caulking tool 60 forces the valve plate 31 against the bottom of the housing cavity 21, thus simultaneously sealing the area between the exit port 22 and the inlet port 23 (or exit port 23 and inlet port 22). Specifically, the circular protuberance on the bottom face of the valve plate 31 penetrates the bottom face of the housing cavity 21 to seal the periphery of the inlet port 23, thus forming a tighter seal between the two ports 22, 23.

Figure 4:
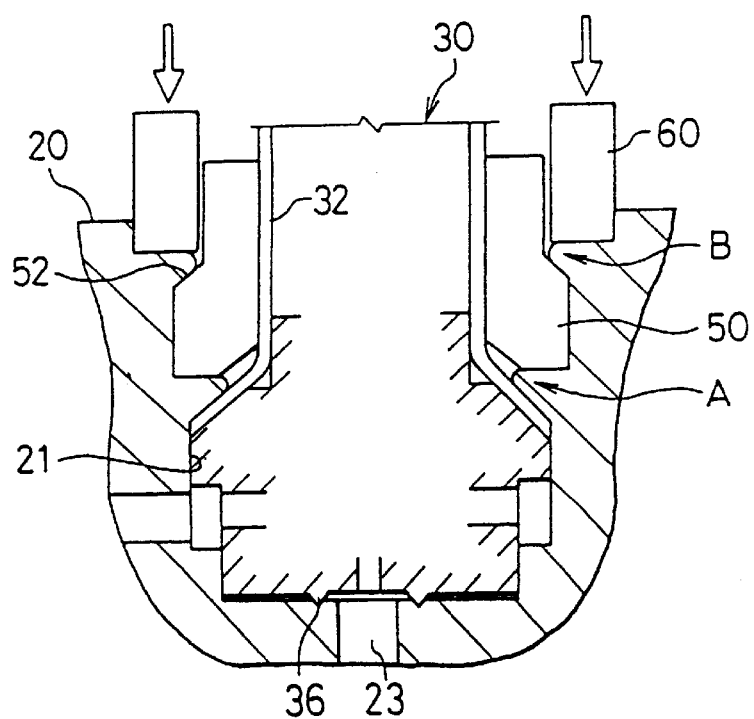
FIG. 4 is a partial cross section diagram of the solenoid valve device of FIG. 1 illustrating the affixing of the armature assembly with a secondary caulking.

(b) Secondary Caulking (FIG. 4)

After primary caulking is completed, as shown in FIG. 4, a collar 50 is inserted between the housing cavity 21 and the armature assembly 30, and the peripheral edge at the mouth of the housing cavity 21 is pressed with a second caulking tool 60'. The pressure causes a portion of the housing 20 material to plastically deform towards the closed end of the housing cavity 21 to form a secondary caulked portion B that caulks against the entire periphery of the shoulder 52 of the collar 50. The secondary caulked portion B has a dual function to affix and to seal the armature assembly 30 via the collar 50.

The pressure of the second caulking tool 60' used in the secondary caulking also acts through the collar 50 onto the primary caulked portion A to augment the affixing and sealing functions of the primary caulking. The pressure also acts on the circular protuberance of the valve plate 31 that seals the periphery of the inlet port 23, thus further tightening the seal around the inlet port 23.

In addition, the collar 50 will correct any misalignment if the armature assembly 30 is not mounted plumb during the formation of the primary caulked portion A.

3. Installation of Coil Assembly (FIG. 1)

Once the armature assembly 30 is affixed to the housing 20, the coil assembly 40 is mounted externally around that portion of the armature assembly protruding outside of the housing. To affix the coil assembly, a retaining ring 44 is fitted around the magnet core 34 protruding above the end of the yoke 43.

If it is necessary to dismantle the solenoid valve device these aforementioned procedures are reversed.

EXAMPLE 2

In the first example, the primary caulked portion A was formed directly with the use of the first caulking tool 60. However, instead of directly using the first caulking tool 60, the collar 50 can be set inside the housing cavity 21. Then the collar 50 is pressed to plasticly deform the portion of the housing at the stepped face 21d to form the primary caulked portion A.

This embodiment has the advantage of eliminating one caulking process with the caulking tool 60. In addition, since the collar is caulked directly, there is greater contact between the collar 50 and the housing 20 to improve the sealing function.

EXAMPLE 3

In Example 1, the exit port 22 and inlet port 23 (or exit port 23 and inlet port 22) were sealed when the sharp circular protuberance 36, formed on the bottom face of the valve plate 31, penetrates into the bottom of the housing cavity 21. However, a known sealing method of fitting a rubber seal around the periphery of the valve plate 31 can also be employed.

EXAMPLE 4

Figure 5:
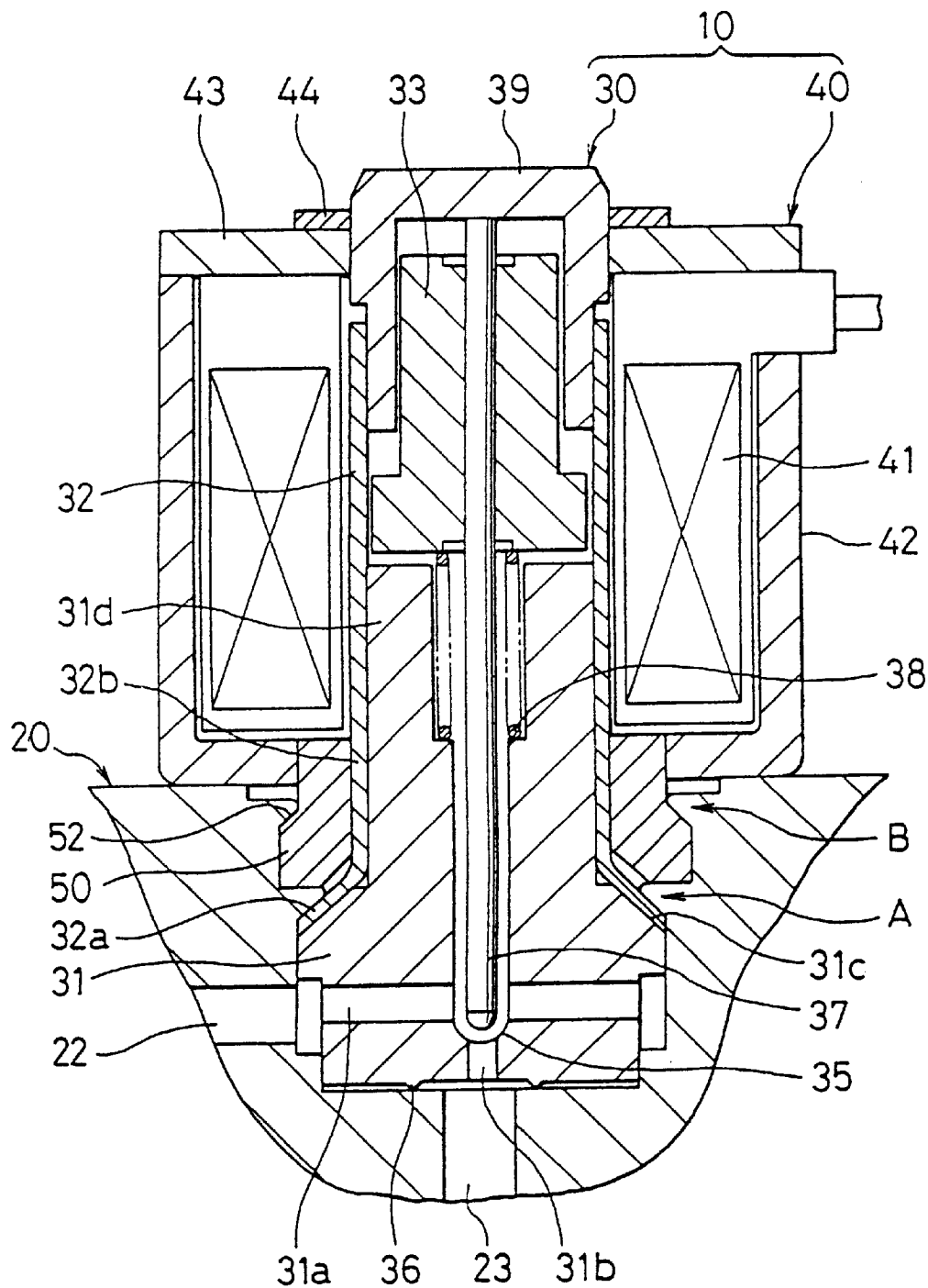
FIG. 5 is a cross section diagram of the solenoid valve device of this invention for a normally-open solenoid valve.

FIG. 5 illustrates another embodiment of this invention for use with normally-open solenoid valves. Those components which are the same as in Example 1 are identified with the same symbols, and a detailed explanation thereof is omitted here.

There are three major differences between the solenoid valve of this embodiment and that of Example 1.

(1) A plug 39 is inserted into the mouth or open end of the sleeve 32 in order to seal the armature 33 mounted within the sleeve.

(2) The valve plate 31 inlaid in the housing cavity 21 also serves as the magnet core.

(3) When the coil is energized, the valve plug 37 is seated in the valve seat 35 thus blocking the fluid duct.

Although not shown in the diagram, a one-way check valve can also be installed in the valve plate 31.

EXAMPLE 5

Figure 6:
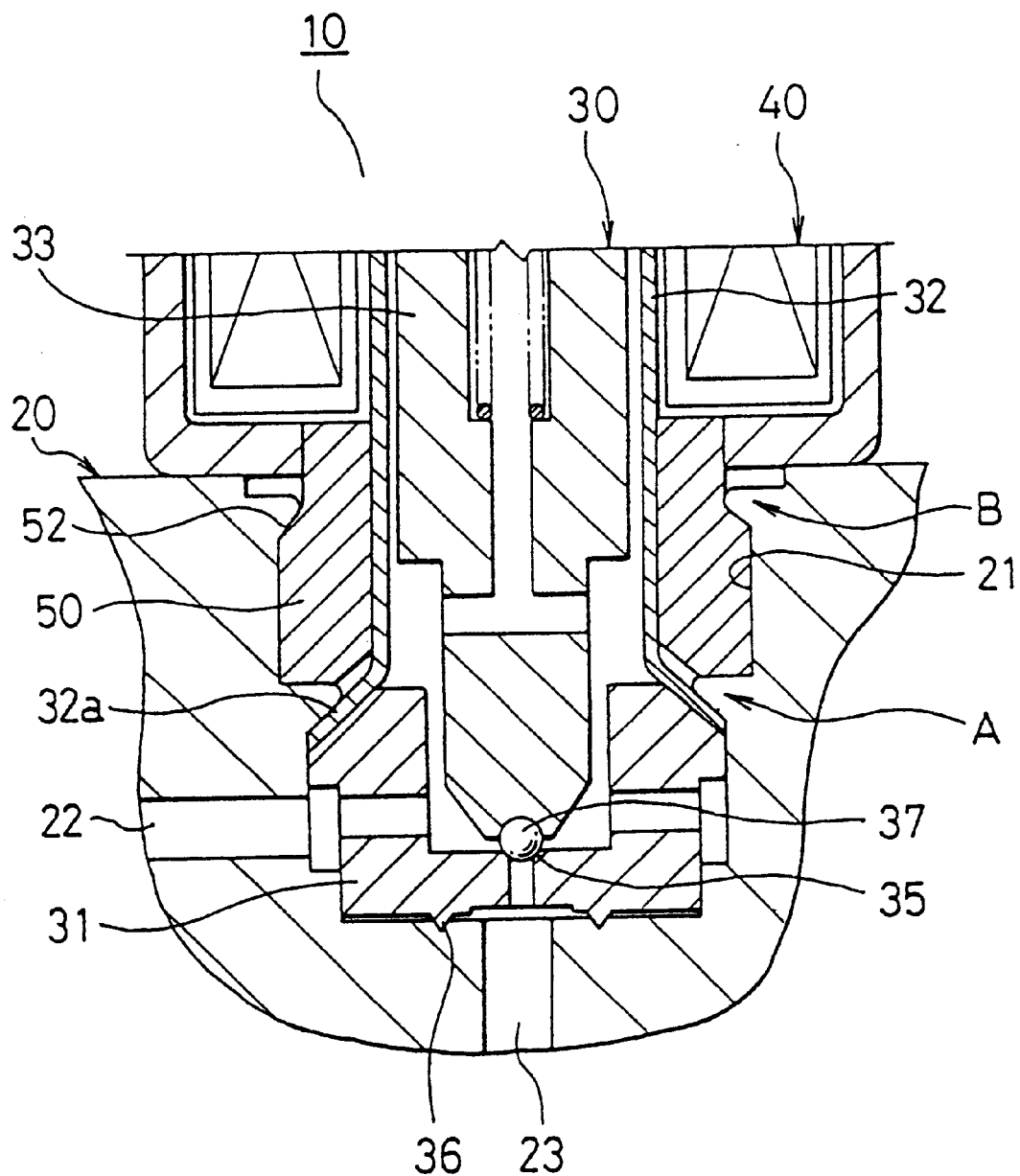
FIG. 6 is a partial cross section diagram of a second embodiment of the solenoid valve device of this invention in which the solenoid valve has not been sub-assembled.
Figure 7:
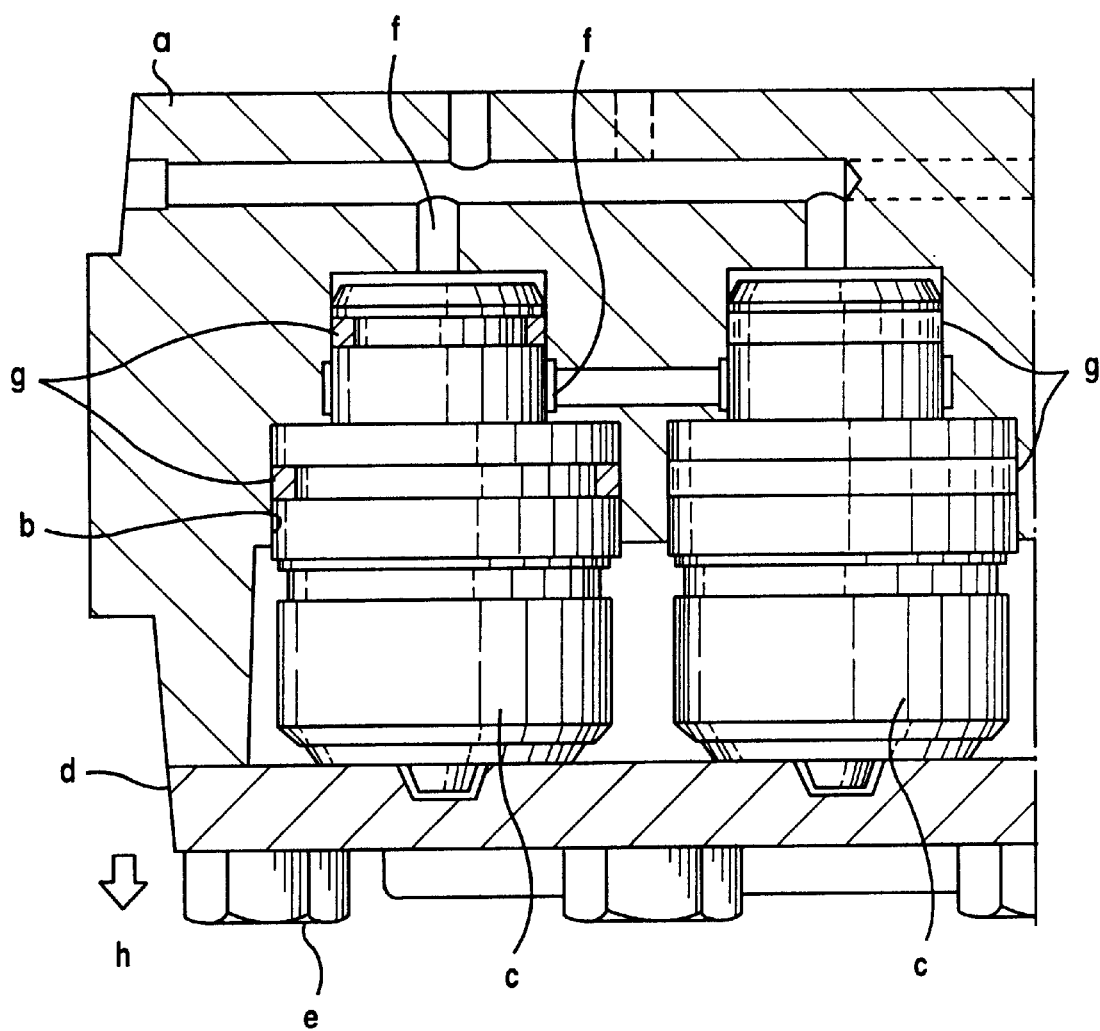
FIG. 7 illustrates a conventional solenoid valve device.

In the previous embodiments, the armature assembly was subassembled, but as shown in FIG. 6, the solenoid valve device of this invention can be used for non-assembled types as well.

The valve plate 31 itself is mounted inside the housing cavity 21, then the sleeve 32 containing the armature 33 is positioned on the valve plate 31. Next the primary crimped joint A is formed, simultaneously affixing the sleeve 32 to the valve plate 31 and the armature assembly 30 to the housing 20.

This embodiment differs from the previous embodiments only in that the affixing of the sleeve 32 to the valve plate 31 is performed inside the housing cavity 21. Otherwise, the configuration and processes are identical, therefore the same symbols are used and an explanation thereof is omitted.

The advantage of this embodiment is that the sleeve 32 is affixed to the valve plate 31 simultaneously with the formation of the primary caulked portion A. This eliminates the need for a separate step to affix the sleeve 32 and the valve seat 31 as is required in the sub-assembly process.

FIG. 6 illustrates this embodiment for a normally-closed solenoid valve 10, but it can also apply to a normally-open solenoid valve.

Effectiveness of this Invention

As explained above, this invention provides the following advantages.

(1) The affixing of the solenoid valve to the housing with the primary caulking on the pressure side of the valve block, and the sealing of the housing cavity between the atmosphere side and the pressure medium side and between the pressure medium ducts, is performed simultaneously. This facilitates the assembly of the solenoid valve device. Further, the secondary caulking reinforces the effectiveness of the affixing and sealing of the primary caulking to yield a solenoid valve device of greater reliability.

(2) The sleeve and the small-diameter segment of the valve plate are joined to be aligned concentrically. The design yields a solenoid valve in which this alignment is retained with high precision. Moreover, this configuration facilitates the sub-assembly of the solenoid valve, making it easier to handle for shipping and assembly.

(3) A rubber seal which is easily eroded is not used, hence leakage of the pressure medium because of a worn rubber seal is not a concern. The invention also eliminates the step of mounting the rubber seal and reduces the number of components for improved parts management.

(4) The solenoid valve is securely affixed to the housing by a double caulking process, thus preventing any shifting of the solenoid valve by the pressure medium.

This eliminates the need for the retaining plate, bolts, and other rigid materials as used in the conventional device, thus making the device smaller and lighter.

Moreover, if the solenoid valve device is used for example, in a vehicle braking system where the pressure medium generates a high pressure, the secured configuration of the solenoid valve prevents any extra consumption of brake fluid, thus preventing any loss in the brake pedal stroke.

(5) Fabrication of the device has been simplified because the collar has the dual function of affixing the armature assembly as well as forming the magnetic core. This also makes the device smaller, lighter, and less expensive.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What I claim is:

1. A solenoid valve device comprising a housing containing at least one housing cavity having a stepped variable diameter and a bottom, an armature assembly inserted into the housing cavity and including a sleeve and an armature, a valve plug housed to slide within said sleeve, and a valve plate containing a valve seat and a bottom face, said valve plate together with said valve plug forming a valve mechanism, and a coil assembly operating said armature with an electromagnetic force; wherein one end of the valve seat on an atmosphere end is formed as a small-diameter portion, and said sleeve fits concentrically over the small-diameter portion, said sleeve is affixed around its perimeter by a caulk joint including a portion of the housing plasticly deformed towards the bottom of the housing cavity, the bottom face of the valve plate being pressed against the bottom of the housing cavity, the armature assembly thereby being affixed to the housing by said caulk joint and the housing cavity between the atmosphere end and a pressure medium end and between pressure medium ducts on either side of the valve mechanism is sealed fluid-tight.

2. A solenoid valve device as claimed in claim 1 in which a circular protuberance is formed on the bottom face of the valve plate, and said circular protuberance penetrates into the bottom of the housing cavity to form a fluid-tight seal between the pressure medium ducts on either side of the valve mechanism.

3. A solenoid valve device comprising a housing containing at least one housing cavity having a stepped, variable diameter and a bottom, an armature assembly inserted into said housing cavity and including a sleeve, a valve plug housed to slide within said sleeve and an armature, and a valve plate containing a valve seat and a bottom face, said valve plate together with said valve plug forming a valve mechanism, a collar having a shoulder formed around its periphery arranged between the housing cavity and the sleeve, and a coil assembly operating said armature with an electromagnetic force; wherein one end of the valve seat on the atmosphere end is formed as a small-diameter portion, and said sleeve fits concentrically over said small-diameter portion, said sleeve is affixed around its perimeter at a primary caulk joint including a portion of the housing plasticly deformed towards the bottom of the housing cavity and at a secondary caulk joint contacting said collar around its perimeter and including another portion of the housing plasticly deformed towards the bottom of the housing cavity, the bottom face of the valve plate being pressed against the bottom of the housing cavity, the armature assembly thereby being affixed to the housing by said collar and said primary and secondary caulk joints, and the housing cavity between an atmosphere end and a pressure medium end and between pressure medium ducts on either side of the valve mechanism is sealed fluid-tight.

4. A solenoid valve device as claimed in claim 3 in which a circular protuberance is formed on the bottom face of the valve plate, and said circular protuberance penetrates into the bottom of the housing cavity to form a fluid-tight seal between the pressure medium ducts on either side of the valve mechanism.

5. A solenoid valve device as claimed in claim 3 in which the collar is made of a magnetic material.

6. A solenoid valve device as claimed in claim 4 in which the collar is made of a magnetic material.

* * * * *